United States Patent
Jang

(10) Patent No.: US 12,513,425 B2
(45) Date of Patent: Dec. 30, 2025

(54) IMAGE SIGNAL PROCESSING SYSTEM AND METHOD INCLUDING PHASE DIFFERENCE DETECTION PIXELS

(71) Applicant: SK hynix Inc., Icheon-si (KR)

(72) Inventor: Cheol Jon Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 229 days.

(21) Appl. No.: 18/360,437

(22) Filed: Jul. 27, 2023

(65) Prior Publication Data

US 2024/0323560 A1    Sep. 26, 2024

(30) Foreign Application Priority Data

Mar. 21, 2023    (KR) .......................... 10-2023-0036670

(51) Int. Cl.
*H04N 25/704* (2023.01)
*H04N 25/46* (2023.01)

(52) U.S. Cl.
CPC .......... *H04N 25/704* (2023.01); *H04N 25/46* (2023.01)

(58) Field of Classification Search
CPC .... H04N 25/704; H04N 25/46; H04N 25/134; H04N 25/618; H04N 25/10
See application file for complete search history.

(56) References Cited

U.S. PATENT DOCUMENTS

| 9,467,629 | B2 | 10/2016 | Okazawa et al. | |
| 9,826,174 | B2 | 11/2017 | Choi et al. | |
| 2014/0293080 | A1* | 10/2014 | Choi | H04N 25/704 348/222.1 |
| 2022/0124264 | A1* | 4/2022 | Jang | H04N 25/616 |
| 2024/0031698 | A1* | 1/2024 | Choi | H04N 25/778 |
| 2024/0205560 | A1* | 6/2024 | Shin | H04N 23/672 |

* cited by examiner

*Primary Examiner* — Gevell V Selby
(74) *Attorney, Agent, or Firm* — WILLIAM PARK AND ASSOCIATES LTD.

(57) ABSTRACT

An image signal processing system capable of performing image processing and an image signal processing method for the same are disclosed. The image signal processor includes an image binning "circuit" generates a down-scaled second image from a first image by summing pixel values of at least one pair of phase difference detection pixels and pixel values of color pixels in the first image. An extractor estimates pixel values of the phase difference detection pixels based on pixel values of the color pixels in a target kernel of the second image. A correction value is obtained by excluding pixel values estimated by the extractor from the target pixel obtained by summing the pixel values of the pair of phase difference detection pixels and the pixel values of the color pixels.

18 Claims, 3 Drawing Sheets

IMAGE SIGNAL PROCESSING SYSTEM AND METHOD INCLUDING PHASE DIFFERENCE DETECTION PIXELS

CROSS-REFERENCE TO RELATED APPLICATION

This patent application claims priority under 35 U.S.C. § 119(a) to, and benefits of, Korean patent application No. 10-2023-0036670, filed on Mar. 21, 2023, in the Korean Intellectual Property Office, which is hereby incorporated by reference in its entirety as part of the disclosure of this patent document.

TECHNICAL FIELD

The technology and implementations disclosed in this patent document generally relate to image processing and a processor capable of performing image processing.

BACKGROUND

An image sensing device captures images by converting incident light into electrical signals using a photosensitive semiconductor material. The need for high performance image sensing devices continues to increase because of the widespread use of image sensors in smart phones, digital cameras, game machines, IoT (Internet of Things), robots, security cameras, among other things.

A pixel array that captures an optical image in an image sensing device may unfortunately include defective pixels that cannot sense color. In order to provide autofocus functionality to an image sensing device, phase difference detection pixel(s) may be included in the pixel array. Phase difference detection pixels capable of acquiring and providing phase-difference information do not acquire color in an image in the same way that defective pixels cannot sense color. Phase difference detection pixels may therefore be "treated" as being defective pixels, from the point of view of color images.

As pixel array fabrication processing improves and autofocus becomes more important, the ratio of defective pixels or phase difference detection pixels to operative, color-sensing pixels continues to increase. Defective pixel correction accuracy and phase difference detection pixels are becoming more important to improving image quality and image sensor performance.

SUMMARY

Various embodiments of the disclosed technology relate to an image signal processing system capable of correcting a target pixel by estimating pixel values of phase difference detection pixels in a pixel binning process in which pixels and phase difference detection pixels "binned" and an image signal processing method for the same.

A preferred embodiment of an image signal processing system may include an image binning circuit, which generates a second image from a first image by summing pixel values of a pair of phase difference-detection pixels and color pixel values in the first image. The image signal processing system also includes an extractor circuit, which is configured to estimate pixel values of the pair of phase difference detection pixels based on pixel values of the color pixels in a target kernel of the second image; a correction value generator configured to generate a correction value obtained by excluding the pixel values estimated by the extractor from the target pixel obtained by summing the pixel values of the at least one pair of phase difference detection pixels and the pixel values of the color pixels; and a corrector configured to correct the target pixel based on the correction value.

In accordance with another embodiment of the disclosed technology, an image signal processing method may include generating a first target pixel by summing a pixel value of a first phase difference detection pixel with color pixel values representing a first color in an image; generating a second target pixel by summing a pixel value of a second phase difference detection pixel and pixel values of color pixels having a second color in the image; estimating pixel values of the first phase difference detection pixel and the second phase difference detection pixel based on pixel values of the color pixels in the image; and generating a correction value based on a pixel value of the first target pixel, a pixel value of the second target pixel, and the estimated pixel values.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Referring now to the figures, an image sensing device may have pixels, which are considered "defective" because they are unable to capture a color image. A pixel array may also include phase difference-detection pixels, which obtain phase-difference information required to implement an autofocus function. Since a phase difference-detection pixel is unable to obtain a color image like a defective pixel, the phase difference detection pixel can be considered or "treated" as a defective pixel, at least with regard to the point of view of a color image. In order to increase the quality of a color image, it is important to increase the accuracy of correcting defective pixels.

Figure 1:
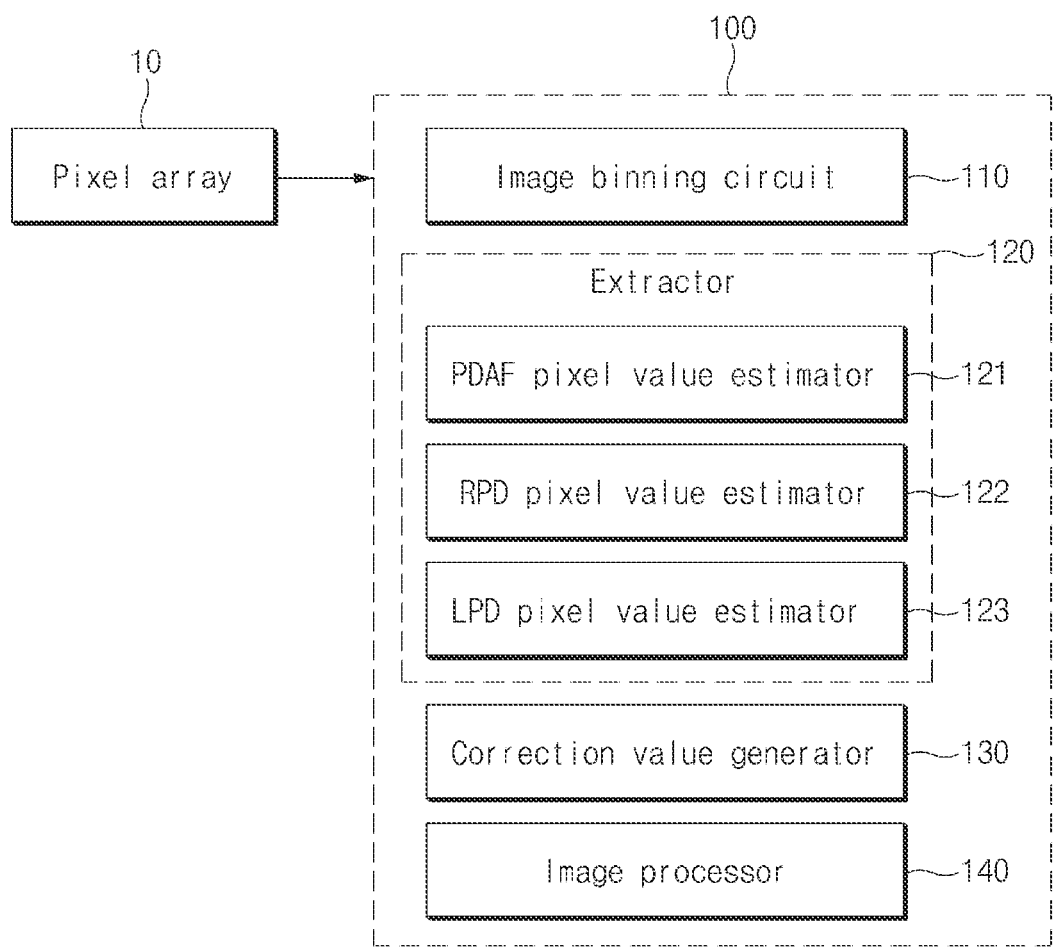
FIG. 1 is a block diagram illustrating an example of an image signal processing system.

FIG. 1 is a block diagram representing functional components of an image signal processing system. The image signal processing system may include a pixel array 10 and an image signal processor 100. The image signal processor 100 may include an image binning circuit 110, an extractor 120, a correction value generator 130, and an image processor 140.

The image binning circuit 110 may output a "second" image by binning a first image. In that regard, as used herein, image binning refers to a process of generating a smaller, downscaled image by summing pixel values of a first image. The "second" image is thus a downscaled "first" image obtained by summing certain pixel values of the "first" image. In FIG. 1, the image binning circuit 110 may generate a downscaled "second" image by summing pixel values of phase difference-detection pixels (i.e., pixels commonly known to those of ordinary skill in the art as phase difference-detection autofocus (PDAF) pixels) of an image sensor with pixel values output from color pixels, other than phase difference detection pixels (PDAF pixels).

The extractor 120 may estimate a pixel value of a target pixel included in a target kernel. A target kernel may include a target pixel to be corrected, and may refer to a unit for image signal processing. In some implementations, a target pixel may refer to a pixel corresponding to a second image generated by summing pixel values of phase difference detection pixels in a sub-pixel array of the first image and pixel values of the remaining color pixels other than the phase difference detection pixels.

For example, a phase difference detection-pixel may include a pair of phase difference detection pixels comprised of two different phase difference-detection pixels. The pair of phase difference detection pixels may include a right-side or "first" phase difference detection pixel (RPD) and a left-side or "second" phase difference detection pixel (LPD) preferably adjacent to and preferably abutting each other.

The extractor 120 may include a PDAF pixel value estimator (hereinafter referred to as a paired pixel value estimator) 121, an RPD pixel value estimator (hereinafter referred to as a first pixel value estimator) 122, and an LPD pixel value estimator (hereinafter referred to as a second pixel value estimator) 123.

In this case, the paired pixel value estimator 121 may estimate a pixel output signal value for each of the paired phase difference detection pixels (RPD, LPD) in response to a preset gain value. That is, the pixel value of the paired phase difference detection pixels (RPD, LPD) may refer to an output signal value obtained by applying a preset gain value to an average value of pixel output values of each of the first phase difference detection pixel (RPD) and the second phase difference detection pixel (LPD).

The first pixel value estimator 122 may estimate a pixel value of the first phase difference detection pixel (RPD) using pixel values of neighboring pixels, i.e, pixels around or surrounding the RPD, hereinafter referred to as "neighboring homogeneous pixels" of the same type, i.e., the same color.

The second pixel value estimator 123 may estimate a pixel value of the second phase difference detection pixel (LPD) using a pixel value estimated by the paired pixel value estimator 121 and a pixel value of the first phase difference detection pixel (RPD) estimated by the first phase difference detection pixel (RPD).

The correction value generator 130 may generate correction values for correcting the target pixel of the second image using the pixel value estimated by the extractor 120. For example, the correction value generator 130 may generate a correction value obtained by excluding the pixel value of the first phase difference detection pixel (RPD) estimated by the extractor 120 from a target pixel including the first phase difference detection pixel (RPD) and other color pixels. The correction value generator 130 may generate a correct value obtained by excluding the pixel value of the second phase difference detection pixel (LPD) estimated by the extractor 120 from a target pixel including the second phase difference detection pixel (LPD) and other color pixels.

The image processor 140 may correct pixel values of target pixels in the second image in response to the correction value generated by the correction value generator 130, such that the image processor 140 may output an image in which the pixel values are corrected. That is, the image processor 140 may compensate for a pixel value generated from a phase difference detection pixel when image processing for a structure in which image pixel(s) and phase difference detection pixel(s) are mixed is performed.

The image signal processor can generate an image value including only desired pixel value(s) by removing undesired pixel values from an image to be compensated, such that the image signal processor can obtain more accurate image values than a process in which an image value to be compensated, is interpolated with another value.

Operations of the image binning circuit 110, the extractor 120, the correction value generator 130, and the image processor 140 described above will be described in more detail with reference to FIGS. 2 and 3 to be described later.

Figure 2:
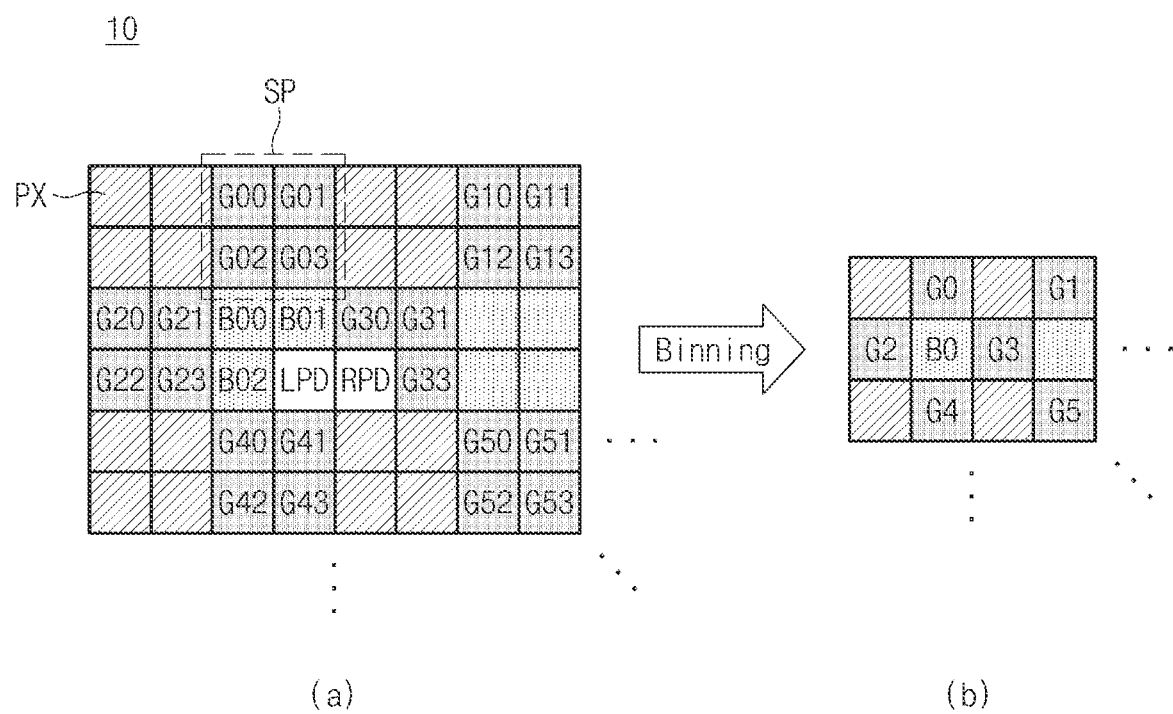
FIG. 2 illustrates a binning mode of pixels including phase difference detection pixels.

FIG. 2 illustrates pixel binning, the binned pixels including phase difference detection pixels.

Referring to FIG. 2, the "first" image input to the image binning circuit 110 may be an image having a quad pattern. The quad pattern may be a pattern of same-color unit pixels (PXs) arranged as shown in a 2×2 matrix comprised of four-unit pixels.

Although the disclosed embodiment contemplates a kernel having a quad-Bayer pattern for convenience of description, the methodology of the disclosed embodiment can also be applied to a different kernel in which color pixels are arranged in other patterns such as a non-Bayer pattern, a hexa-Bayer pattern, an RGBW pattern, a mono pattern, etc. The types of image patterns are therefore not limited and can be changed as appropriate.

In FIG. 2, only a part (including 8 rows and 6 columns) of the pixel array (10) is shown for convenience of description, but the scope or spirit of the disclosed technology is not limited thereto. Pixels of a different-size pixel array, i.e., having a size other than the 8×6 size, may also be used depending on a required correction accuracy, a color pixel arrangement method and the like.

As shown in FIG. 2(b), binning the "first" image by the binning circuit 110 yields the downscaled "second" image. As used herein, 'binning' refers to summation of pixel values of the unit pixels (PXs) having the same color on a sub-pixel array (SP) basis. That is, the image binning circuit 110 may generate the "second" downscaled image by summing certain values of adjacent pixels, i.e., adjacent pixel values, which comprise the "first" image. For example, the image binning circuit 110 may sum, i.e., add together, pixel values of the unit pixels (PXs) of the "first" image that are "adjacent" and have the same color, in units of four pixel values comprising a 2×2 matrix of pixels and "assign" the sum of the four, pixel values to a single pixel in a new, "second" image. Successive summations of pixel values comprising other 2×2 pixel matrices and the successive assignment of those sums to other new pixels of the "second" image results in the formation of the second image.

In some implementations, the summations of "first" image pixels are not of four-pixel matrices but may instead by summations of other numbers of adjacent pixels.

Binning may be used for various purposes, such as increasing a frame rate or to improve brightness (luminance) in a low-illuminance environment. The "first" image in the binning process may include defective pixels (e.g., paired phase difference-detection pixels RPD and LPD), the operating characteristics of which may differ from neighboring, e.g., merely nearby pixels or actually abutting pixels. That is, defective pixels in the "first" image may be a pair of phase difference-detection pixels (RPD, LPD) adjacent to and abutting each other. One pair of phase difference detection pixels (RPD, LPD) may be located at positions from where color pixels would normally be located. arranged. In some instances, a first phase difference detection pixel (RPD) located at the right side of an image, which is itself made up of numerous pixels of different colors, may be located in a sub-pixel array on the right side, which is having a green color a second phase difference detection pixel (LPD) located at the left side of the same image made up of numerous, pixels of different colors, may be located in a sub-pixel array having a blue color. In other words, one pair of phase difference detection pixels (RPD, LPD) may be arranged or paired with pixels in different heterogeneous color regions.

However, although one pair of phase difference detection pixels LPD and RPD is arranged across different heterogeneous color regions, the pair of phase difference detection pixels LPD and RPD may include color filters of the same color. For example, the pair of phase difference detection pixels LPD and RPD may include a green color filter or a white color filter. However, this is merely an example, and the scope of colors of a color filter of the paired phase difference detection pixels (LPD, RPD) may not be limited thereto.

In some alternate embodiments, the phase difference detection pixels RPD and LPD are located adjacent to each other. Other alternate embodiments have phase difference detection pixels RPD and LPD located at randomly different positions in various different patterns. Moreover, while a pair of phase difference detection pixels RPD and LPD may be being arranged across a sub-pixel array having a green color and a sub-pixel array having a blue color, it should be noted that such different-color pixel combinations can also be changed as needed without departing from the scope of the disclosed technology.

In pixel binning, the phase difference detection pixels RPD and LPD may be included in the image, so that the pixel binning mode for the image may be performed. When phase difference detection pixels RPD and LPD are mixed with the image, however, the output image may be distorted. When image pixels include phase difference detection pixels RPD and LPD that are simply regarded as defective pixels and compensated for, a correction error may occur in a texture in which a high frequency component is present. Moreover, when the number of phase difference detection pixels RPD and LPD increases, a technique for correcting an image in which phase difference detection pixels RPD and LPD are mixed becomes complicated and more difficult.

For example, when the pixel binning mode is performed on a "first" image that includes phase difference detection pixels RPD and LPD, pixel values of the "first" image may be summed such that pixel values of the sub-pixel array SP (including G00, G01, G02, and G03) may be summed and binned into the single, pixel G0 of the down-scaled "second" image. Pixel values of the sub-pixel array SP (including G10, G11, G12, and G13) may be summed and binned into the single pixel G1 of the down-scaled "second" image. Similarly, pixel values of the sub-pixel array SP (including G20, G21, G22, and G23) may be summed and binned into the pixel G2. Pixel values of the sub-pixel array SP (including G40, G41, G42, and G43) may be summed and binned into the pixel G4. Pixel values of the sub-pixel array SP (including G50, G51, G52, and G53) may be summed and binned into the pixel G5.

Furthermore, all pixel values of the sub-pixel array SP (including B00, B01, B02, and LPD) may be summed and binned into the pixel B0. Pixel values of the sub-pixel array SP (including G30, G31, G32, and RPD) may be summed and binned into the pixel G3.

In other words, in the pixel binning mode in which the phase difference detection pixels RPD and LPD are included in an image and the binning operation of the resultant image is performed, a down-scaled and smaller image made up of much fewer pixels, may be formed by mixing pixel values of the phase difference detection pixels (RPD, LPD) with pixel values of color pixels of the image, other than the phase difference detection pixels (RPD, LPD). In yet other words, when the unit pixels (PXs) are summed in units of four pixels (4-summation), the summation operation of such pixels may be performed while the phase difference detection pixel LPD or RPD is included in the sub-pixel array SP. However, since this binning mode uses all pixels included in the sub-pixel array SP (including the phase difference detection pixel), image distortion may occur in a high-frequency output image.

The embodiment of the disclosed technology may be applied to a pixel binning mode in which a binning operation on pixels including the phase difference detection pixels (RPD, LPD) is performed. The embodiment of the disclosed technology may estimate pixel values of the phase difference detection pixels (LPD, RPD) using pixel values of color pixels mixed with the phase difference detection pixels (LPD, RPD) and pixel values of neighboring pixels of the same type (i.e., the neighboring homogeneous pixels). Thereafter, the embodiment of the disclosed technology may correct a target pixel by subtracting the estimated pixel values of the phase difference detection pixels (LPD, RPD) from the binned target pixel obtained by mixing the phase difference detection pixels (LPD, RPD). Accordingly, the disclosed technology can prevent a correction error that may occur in a texture in which a high frequency component exists in the binning mode.

Figure 3:
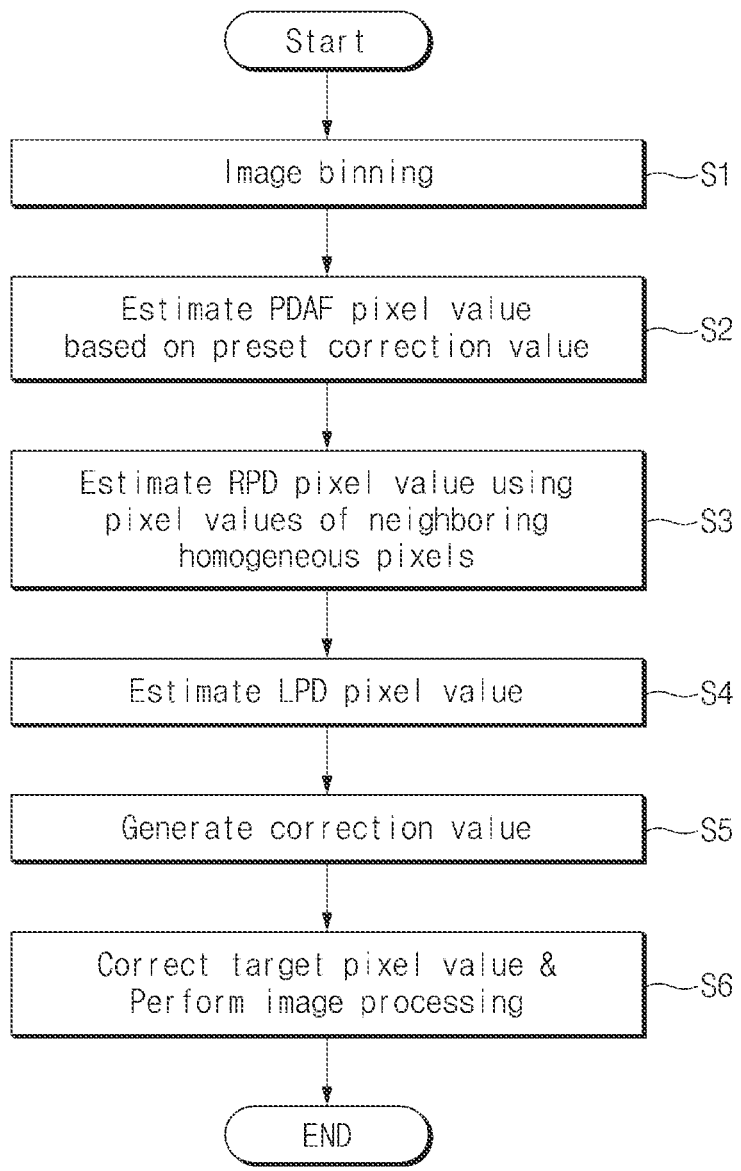
FIG. 3 is a flowchart illustrating an example of an image signal processing method.

FIG. 3 is a flowchart illustrating an example of an image signal processing method based on some implementations of the disclosed technology. For explanation simplification purposes, the image processing method shown in FIG. 3 will hereinafter be described using binning operations performed on 2×2 pixel matrices such as those shown in FIG. 2 as an example.

Referring to FIG. 3, the binning circuit 110 may generate a "second" down-scaled image from a larger, "first" image by summing pixel values of paired phase difference detection pixels (RPD, LPD) selected from pixels comprising a larger "first" image and pixel values of other pixels of an image, which are color pixels other than the paired phase difference detection pixels (RPD, LPD) as described above with reference to FIG. 2 (Operation S1).

The paired pixel value estimator 121 may estimate pixel values of the paired phase difference detection pixels (RPD, LPD) in response to a preset gain value (Operation S2). Here, the preset gain value can be configured (or set) by the following equation 1.

$$PDcal = \text{(average pixel value of green pixels included in a specific region)} / \text{(average pixel value of the paired phase differencce detection pixels included in a specific region)} \quad \text{[Equation 1]}$$

An average pixel value of the first phase difference detection pixel RPD and the second phase difference detection pixel LPD may have a specific ratio compared to neighboring green pixels. The specific ratio of the first phase difference detection pixel RPD to the second phase difference detection pixel LPD is defined herein as a "PD" calibration value (PDcal). "PDcal" is thus referred to hereinafter as a "preset gain value".

The preset gain value (PDcal) may be measured for each image sensor, and may be calculated in advance for each pixel position for each image sensor. The preset gain value (PDcal) may be calculated as a ratio of an average pixel value of green pixels within a specific region (for example, (100×100) pixels), to an average pixel value of paired phase difference detection pixels (RPD, LPD) in the same specific region. That is, the preset gain value (PDcal) may be set to a value obtained by dividing an average pixel value of green pixels included in a specific region, by an average pixel value of paired phase difference detection pixels (RPD, LPD) in the same region.

Accordingly, a value obtained by estimating pixel values of the paired phase difference detection pixels (RPD, LPD) may be represented by the Equation 2, inset below. Hereinafter, an expression indicating a specific pixel used in the following equation may mean a pixel value of the specific pixel.

$$(LPD + RPD)/2 \times PDcal = (G0 + G1 + G4 + G5)/16 \quad \text{[Equation 2]}$$

An average pixel value of the first phase difference detection pixel RPD and the second phase difference detection pixel LPD may first be calculated, i.e., (LPD+RPD)/2, and multiplied by the preset gain value (PDcal). A pixel value of one pixel (i.e., one G pixel) from among the neighboring homogeneous pixels may be determined by dividing the sum of pixel values of G0, G1, G4, and G5 pixels by 16 (i.e., a total number of green pixels G00~G03, G10~G13, G40~G43, and G50~G53).

Thereafter, the first pixel value estimator 122 may estimate the pixel value of the first phase difference detection pixel RPD located in a region of the green pixels using the pixel values of the neighboring homogeneous pixels (Operation S3).

$$(G30 + G31 + G33)/3 \fallingdotseq \quad \text{[Equation 3]}$$
(average value of neighboring green pixels)/4

(average value of neighboring green pixels) = [Equation 4]
$$(G0 + G1 + G4 + G5)/4$$

As can be seen from Equation 3 and Equation 4, the pixel values of green color pixels not mixed with the pixel value of the first phase difference detection pixel RPD may have a value similar to or equal to an average value of pixel values of the neighboring green color pixels.

$$G3 = G30 + G31 + G33 + RPD \quad \text{[Equation 5]}$$

As can be seen from Equation 5 above, a pixel value of the target pixel (e.g., the green pixel G3) may be equal to a value obtained by summing pixel values of four pixels (G30, G31, G33, RPD) in the sub-pixel array SP.

Accordingly, the pixel value of the first phase difference detection pixel RPD estimated by the first pixel value estimator 122 can be obtained by Equation 6 as follows.

$$RPD = G3 - (G0 + G1 + G4 + G5)/16 \times 3 \quad \text{[Equation 6]}$$

As can be seen from Equation 6, values (G0, G1, G4, G5) of the four neighboring green color pixels may be divided by 16, the resultant value of such division may be multiplied by 3, and the resultant value of such multiplication may be subtracted from a pixel value of the target pixel (e.g., the green pixel G3), such that a pixel value of the first phase difference detection pixel RPD can be estimated. That is, the pixel value of the first phase difference detection pixel RPD can be estimated using pixel values of the neighboring homogeneous pixels (i.e., a total of 16 neighboring homogeneous pixels) adjacent to each other in diagonal directions of rows and columns of the pixel array with respect to the sub-pixel array SP including the first phase difference detection pixel RPD.

Subsequently, the second pixel value estimator 123 may estimate a pixel value of the second phase difference detection pixel LPD in response to a pixel value estimated by the paired pixel value estimator 121 and a pixel value of the first phase difference detection pixel RPD estimated by the first pixel value estimator 122 (Operation 4).

$$LPD = \big((G0 + G1 + G4 + G5)/16/PDcal - RPD/2\big) \times 2 = \quad \text{[Equation 7]}$$
$$\big((G0 + G1 + G4 + G5)/16/PDcal -$$
$$\big(G3 - (G0 + G1 + G4 + G5)/16 \times 3\big)/2\big) \times 2$$

That is, the pixel value of the second phase difference detection pixel LPD may be calculated by substituting each of the pixel value of the first phase difference detection pixel RPD obtained in Equation 6 and the pixel values of the paired phase difference detection pixels (RPD, LPD) obtained in Equation 2 into Equation 7.

Since the number of green pixels in a quad pattern is N times (e.g., 2 times) the number of blue pixels and red pixels, the pixel values of the phase difference detection pixels can be estimated using a smaller-sized kernel. Moreover, since neighboring homogenous (green) pixels are located adjacent to the first phase difference detection pixel RPD (for example, each neighboring homogeneous (green) pixel is spaced apart from the first phase difference detection pixel RPD by a distance of one pixel in a diagonal direction), a more accurate pixel value can be extracted from a texture of a high-frequency component in the image. Accordingly, the pixel value of the first phase difference detection pixel RPD may first be estimated using pixel values of neighboring homogeneous pixels (e.g., pixel values of green pixels), and the pixel value of the second phase difference detection pixel LPD may then be estimated using the estimated pixel value of the first phase difference detection pixel RPD.

As described above, although the embodiment of the disclosed technology has disclosed an example in which a pixel value of the first phase difference detection pixel RPD is first obtained and used to estimate a pixel value of the second phase difference detection pixel LPD for convenience of description, the order of estimating pixel values is not limited thereto and various changes are also possible.

Thereafter, the correction value generator 130 may generate correction values for correcting the target pixel in response to the pixel values estimated by the extractor 120 (Operation S5).

For example, as can be seen from Equation 8 below, in the case of the pixel G3 from among the target pixels, the first phase difference detection pixel RPD and the pixels G30, G31, and G33 corresponding to color pixels of the sub-pixel array SP are summed and binned into the pixel G3. That is, the pixel values of the color pixels and the pixel value of the phase difference detection pixel may be mixed in the pixel G3. In some implementations of the disclosed technology, the expression 'color pixels' may mean the remaining pixels other than the phase difference detection pixel(s) in the sub-pixel array SP including the phase difference detection pixel(s).

$$G3 = G30 + G31 + G33 + RPD \qquad \text{[Equation 8]}$$

Therefore, as shown in Equation 9 and Equation 10 below, the correction value generator 130 may subtract the estimated pixel value of the first phase difference detection pixel RPD from the pixel value of the pixel G3 in which the pixel value of the first phase difference detection pixel RPD and pixel values of the color pixels (G30, G31, G33) are mixed, may multiply the resultant value of such subtraction by a coefficient "4", may divide the resultant value of such division by '3', and may thus obtain a pixel value G3'.

$$G3' = (G3 - RPD) \times 4/3 \qquad \text{[Equation 9]}$$

$$G3' = \{(G3 - (G0 + G1 + G4 + G5)/16 \times 3\} \times /3 \qquad \text{[Equation 10]}$$

Meanwhile, as shown in Equation 11 below, in the case of the pixel B0, the second phase difference detection pixel LPD and the pixels B00, B01, and B02 corresponding to color pixels of the sub-pixel array SP are summed and binned into the pixel B0. That is, the pixel values of the color pixels and the pixel value of the phase difference detection pixel may be mixed in the pixel B0.

$$B0 = B00 + B01 + B02 + LPD \qquad \text{[Equation 10]}$$

Therefore, as shown in Equation 12 and Equation 13 below, the correction value generator 130 may subtract the estimated pixel value of the second difference detection pixel LPD from the pixel value of the target pixel (i.e., B0 pixel) in which the pixel value of the second phase difference detection pixel LPD and pixel values of the color pixels (B00, B01, B02) are mixed, and may thus obtain a pixel value B0'.

$$B0' = (B0 - LPD) \times 4/3 \qquad \text{[Equation 12]}$$

$$B0' = \{B0 - ((G0 + G1 + G4 + G5)/16/PDcal -$$
$$(G3 - (G0 + G1 + G4 + G5)/16 \times 3)/2) \times 2\} \times 4/3 \qquad \text{[Equation 13]}$$

The binned target pixels (i.e., G3 and B0 pixels) including the phase difference detection pixels (RPD, LPD) may include undesired pixel values. As described above, the correction value generator 130 may generate a correction value by excluding the estimated pixel value of the first phase difference detection pixel RPD from a pixel value of the binned target pixel including the first phase difference detection pixel RPD and excluding the estimated pixel value of the second phase difference detection pixel LPD from a pixel value of the binned target pixel including the second phase difference detection pixel LPD.

Subsequently, the image processor 140 may correct values of the target pixels in response to the correction values (e.g., the above-described G3' and B0' values) determined by the correction value generator 130, and may output an image in which the pixel values are corrected (Operation S6).

As is apparent from the above description, the image signal processor and the image signal processing method based on some implementations of the disclosed technology can correct a target pixel by estimating pixel values of phase difference detection pixels in a pixel binning mode, thereby preventing a correction error of phase difference detection pixels, thereby preventing correction errors of phase difference detection pixels that can be seen as a regular pattern in a high frequency region.

Although a number of illustrative embodiments have been described, it should be understood that modifications and enhancements to the disclosed embodiments and other embodiments can be devised based on what is described and/or illustrated in this patent document. The true scope of the invention is therefore defined by the appurtenant claims.

What is claimed is:

1. An image signal processing system comprising:
   an image sensor comprised of a plurality of pixels;
   an image binning circuit configured to generate a second image from a first image by summing pixel values of at least one pair of phase difference detection pixels and pixel values of color pixels in the first image;
   an extractor configured to estimate pixel values of the at least one pair of phase difference detection pixels based on pixel values of the color pixels in a target kernel of the second image;
   a correction value generator configured to generate a correction value obtained by excluding the pixel values estimated by the extractor from the target pixel obtained by summing the pixel values of the at least one pair of phase difference detection pixels and the pixel values of the color pixels; and
   a corrector configured to correct the target pixel based on the correction value,
   wherein the extractor includes:
   a paired pixel value estimator configured to estimate pixel values of the at least one pair of phase difference detection pixels based on a preset gain value.

2. The image signal processing system according to claim 1, wherein:
   the phase difference detection pixels of the at least one pair of phase difference detection pixels are disposed adjacent to each other in different sub-pixel arrays of the image sensor.

3. The image signal processing system according to claim 1, wherein the at least one pair of phase difference detection pixels includes:
   a first phase difference detection pixel disposed in a sub-pixel array of a first color; and
   a second phase difference detection pixel disposed in a sub-pixel array of a second color.

4. The image signal processing system according to claim 3, wherein:
   each of the first phase difference detection pixel and the second phase difference detection pixel includes a color filter of the same color.

5. The image signal processing system according to claim 1, wherein:

the preset gain value is set to a value obtained by dividing an average pixel value of pixels having a predetermined color by an average pixel value of the at least one pair of phase difference detection pixels.

6. The image signal processing system according to claim 1, wherein:
the paired pixel value estimator is configured to estimate a pixel value by multiplying an average value of pixel values of the at least one pair of phase difference detection pixels by the preset gain value.

7. The image signal processing system according to claim 1, wherein the extractor includes:
a first pixel value estimator configured to estimate a pixel value of a first phase difference detection pixel from among the at least one pair of phase difference detection pixels; and
a second pixel value estimator configured to estimate a pixel value of a second phase difference detection pixel from among the at least one pair of phase difference detection pixels using the estimated pixel values of the at least one pair of phase difference detection pixels and the estimated pixel value obtained by the first pixel value estimator.

8. The image signal processing system according to claim 7, wherein:
the first pixel value estimator is configured to estimate a pixel value of the first phase difference detection pixel using pixel values of neighboring homogeneous pixels.

9. The image signal processing system according to claim 8, wherein:
the first pixel value estimator is configured to estimate a pixel value of the first phase difference detection pixel using an average pixel value of the neighboring homogeneous pixels located adjacent to each other in a diagonal direction with respect to the first phase difference detection pixel.

10. The image signal processing system according to claim 7, wherein:
the correction value generator is configured to generate the correction value obtained by excluding the pixel value of the first phase difference detection pixel estimated by the extractor and the pixel value of the second phase difference detection pixel estimated by the extractor from the target pixel.

11. An image signal processing method comprising:
generating a first target pixel by summing a pixel value of a first phase difference detection pixel and pixel values of color pixels having a first color in an image;
generating a second target pixel by summing a pixel value of a second phase difference detection pixel and pixel values of color pixels having a second color in the image;
estimating pixel values of the first phase difference detection pixel and the second phase difference detection pixel based on pixel values of the color pixels in the image; and
generating a correction value based on a pixel value of the first target pixel, a pixel value of the second target pixel, and the estimated pixel values,
wherein the estimating the pixel values includes:
estimating a summed pixel value obtained by summing pixel values of the first phase difference detection pixel and the second phase difference detection pixel in response to a preset gain value.

12. The image signal processing method according to claim 11, wherein the generating the correction value includes:
generating a first correction value by excluding a first pixel value from among the estimated pixel values from a pixel value of the first target pixel; and
generating a second correction value by excluding a second pixel value from among the estimated pixel values from a pixel value of the second target pixel.

13. The image signal processing method according to claim 12, further comprising:
correcting the target pixel in response to the first correction value and the second correction value.

14. The image signal processing method according to claim 11, wherein the estimating the pixel values includes:
estimating the summed pixel value by multiplying an average value of the pixel values of the first phase difference detection pixel and the second phase difference detection pixel by the preset gain value.

15. The image signal processing method according to claim 11, wherein the estimating the pixel values includes:
determining the preset gain value by dividing an average pixel value of pixels having a green color by an average value of pixel values of the first phase difference detection pixel and the second phase difference detection pixel.

16. The image signal processing method according to claim 11, wherein the estimating the pixel values includes:
estimating a pixel value of the first phase difference detection pixel in response to pixel values of neighboring homogeneous pixels.

17. The image signal processing method according to claim 16, wherein the estimating the pixel values includes:
obtaining an average pixel value of the neighboring homogeneous pixels located adjacent to each other in a diagonal direction with respect to the first phase difference detection pixel; and
estimating a pixel value of the first phase difference detection pixel in response to the average pixel value.

18. The image signal processing method according to claim 16, wherein:
the neighboring homogeneous pixels are pixels having a green color.

* * * * *